United States Patent Office.

SAMUEL C. BISHOP, OF NEW YORK, N. Y., ASSIGNOR TO THE BISHOP GUTTA-PERCHA COMPANY, OF THE SAME PLACE.

Letters Patent No. 73,288, dated January 14, 1868.

IMPROVED WATER-PROOF CLOTH.

*The Schedule referred to in these Letters Patent and making part of the same.*

TO ALL WHOM IT MAY CONCERN:

Be it known that I, SAMUEL C. BISHOP, of the city, county, and State of New York, have invented or discovered a new and useful Water-Proof Cloth, of which the following is a full, clear, and exact description.

This, my improved water-proof cloth, is designed to be used for all or most purposes to which India-rubber cloth is applicable, and may be prepared in like manner, by soaking, macerating, and rolling in an even sheet, upon a web of cotton or other cloth previously coated or saturated with the substance, valata or balata, a gum which is obtained from a tree or plant indigenous to English, French, and Dutch Guiana, and other portions of South America, and which possesses, for the purpose of water-proofing, some advantages over both India rubber and gutta percha, as it needs no vulcanization like India rubber; and besides, being capable of withstanding a much higher temperature than gutta percha, is less friable and brittle than the latter substance. A most serviceable water-proof cloth, therefore, is thus prepared, by sheeting out valata or balata in connection with cotton or other suitable cloth, which may be applied to the manufacture of hose or any other purpose for which water or damp-proof cloth is required. In some cases, instead of the fully-developed gum, the milk or milk-juice of the younger shoots of the same tree may be used and applied to the cotton or other cloth by a brush, and the whole afterwards run through heated rolls.

What I here claim, and desire to secure by Letters Patent, is—

A water-proof cloth prepared with valata or balata gum, or milk applied to or used in connection with cotton in any suitable way, substantially as specified.

SAM. C. BISHOP.

Witnesses:
   P. NOLAN,
   GEORGE H. STARR.